July 23, 1963

W. G. MARTIN 3,098,582

FIBER REINFORCED PLASTIC VESSEL AND METHOD OF MAKING THE SAME

Filed June 19, 1959

INVENTOR.
WESLEY G. MARTIN

BY *Andrus & Starke*

Attorneys

United States Patent Office 3,098,582
Patented July 23, 1963

3,098,582
FIBER REINFORCED PLASTIC VESSEL AND
METHOD OF MAKING THE SAME
Wesley G. Martin, Milwaukee, Wis., assignor to A. O. Smith Corporation, Milwaukee, Wis., a corporation of New York
Filed June 19, 1959, Ser. No. 821,415
5 Claims. (Cl. 220—67)

This invention relates to a fiber reinforced plastic vessel and more particularly to a method of securing a head within a fiber reinforced plastic shell.

Fiber reinforced plastic vessels are finding increased use in applications where corrosion resistance is a prime requisite. Generally, the cylindrical shell or wall of a fiber reinforced plastic vessel is fabricated by winding a resin impregnated fiber strand in a helical pattern, or by molding resin impregnated fabric or fibrous material to the cylindrical shape. After curing of the resin, the ends of the cylindrical shell are enclosed by molded or preformed heads. As the vessel, in service, is frequently subjected to high internal pressures, it is important that the head be firmly anchored within the shell.

The present invention is directed to a fiber reinforced plastic vessel and to a method of securing the heads within the open ends of the vessel shell or wall. According to the invention, the head is formed of reinforced plastic and is provided with a peripheral flange. The head is inserted within the end of the shell with the flange extending outwardly and the flange being in lapping relation with the inner surface of the shell. A suitable cement or bonding agent is employed between the adjacent surfaces to aid in sealing the junction between the head flange and the shell.

To firmly secure the head within the shell, a fiber strand impregnated with a suitable thermosetting resin is wound over the outer surface of the shell in alignment with the overlapping areas between the head flange and the shell. The strand is wound under high tension and serves to deform the shell and flange and reduce the diameter of the overlapping area. This reduction in area serves to firmly hold the head within the shell and prevents outward movement of the head when the vessel is subjected to high internal pressures.

It is also contemplated that the fibrous strand be impregnated with a heat-shrinkable resin, such as a polyester resin. The shrinkage of the resin on curing will provide an additional force on the overlapping area to further contract this area and hold the head within the shell.

The present invention provides a lightweight, corrosion resistant vessel in which the heads are securely bonded within the ends of the shell. As the end of the shell is reduced in diameter due to the fiber winding, the head will be retained within the shell under high pressures and temperatures.

Other objects and advantages will appear in the course of the following description.

The drawings illustrate the best mode presently contemplated of carrying out the invention.

Figure 1:
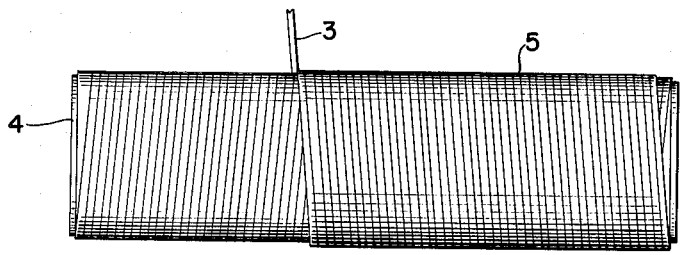
FIGURE 1 is a side elevation of a fibrous strand wound on a mandrel to form a generally tubular article which is subsequently cut into a series of cylindrical shells.
Figure 2:
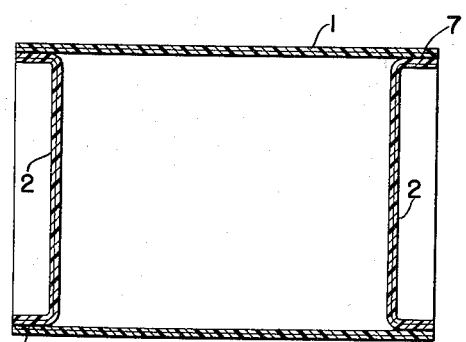
FIG. 2 is a longitudinal section of a cylindrical shell with the heads disposed therein.

The drawings illustrate a fiber reinforced plastic vessel comprising a generally cylindrical shell 1 having the ends enclosed by a pair of heads 2.

To fabricate the vessel, a resin impregnated fiber strand 3 is initially wound on a generally cylindrical mandrel 4 in a series of superimposed helical layers to form the tubular member 5. The strand 3 is wound with the desired number of layers to provide the tubular member 5 with the required thickness for service.

The fiber strand 3 is preferably composed of long, substantially continuous fibers or filaments. The fibers may be formed of a refractory material, such as glass fibers, mineral fibers, or ceramic fibers; synthetic materials, such as nylon, rayon, Orlon; or animal or vegetable fibers.

The resin is impregnated with a liquid uncured thermosetting resin, such as an epoxy, polyester, urea, melamine, furane or the like. A commonly used thermosetting resin is the reaction product of bis phenol A and epichlorohydrin, having a small amount of a curing agent, such as a tertiary amine.

After the tubular article, shown in FIG. 1, has been wound with the desired wall thickness, the resin is cured, preferably by heating, and the resulting tubular article is stripped from the mandrel. The tubular article is then cut into a series of sections, each section comprising a shell 1 of a vessel.

The heads 2 are provided with peripheral flanges 6 which are disposed in contiguous relation with the inner surface of the shell 1. The flanges of the heads face outwardly of the shell and the rim on the flange is substantially flush with the end of the shell.

To seal the flange 6 to the inner surface of the shell 1, an adhesive 7 is employed between the adjacent surfaces of the members.

The head 2 is securely clamped within the shell by means of a fibrous strand 8 which is wound under high tension around the outer surface of the shell 1. The strand 8 is wound adjacent the end of the shell and serves to deform the shell 1 and flange 5 and, in effect, provides a reduced diameter for the end of the composite structure. The reduced diameter serves to prevent the head 2 from moving outwardly within the shell when the heads are subjected to internal pressure.

The fibrous strand 8 is formed of substantially continuous fibers, and the fibers are formed of a material similar to that of the fiber strand 3. The strand 8 is impregnated with a suitable uncured thermosetting resin and it is preferred that the resin take the form of a heat shrinkable type which will shrink on curing. A polyester resin has proven very satisfactory, for the polyester will shrink when cured which provides an added force on the ends of the shell to deform the same.

Figure 4:
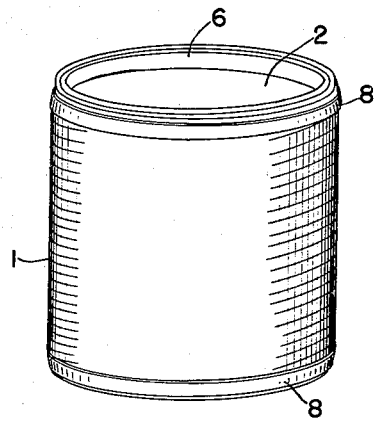
FIG. 4 is a perspective view of the completed vessel with the heads secured therein.
Figure 3:
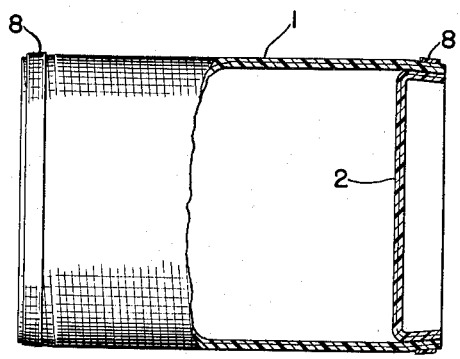
FIG. 3 is a side elevation with parts broken away showing the fiber strand wound around the ends of the shell.

After the strand 8 is wound over the shell, the vessel is heated to cure the resin and provide an integral vessel as shown in FIG. 4. Suitable openings may then be cut in the vessel wall and head for the insertion or removal of materials.

The present invention provides a simple and inexpensive way of securing heads within a cylindrical shell. The fibrous strand 8, which is wound under high tension, serves to deform the end of the shell and the flange 5 and prevents the heads from moving outwardly when the vessel is subjected to high internal pressure. The use of a heat shrinkable resin in combination with the fiber strand 8 provides further tension on the strand to maintain the members in the deformed condition.

Various modes of carrying out the invention are contemplated as being within the scope of the following claims particularly pointing out and distinctly claiming the subject matter which is regarded as the invention.

I claim:
1. A method of forming a fiber reinforced plastic vessel, comprising inserting a head having a central portion and having a peripheral flange extending axially from said central portion within the open end of a generally cylindrical shell with the flange facing outwardly of the end of the shell, winding a strand of resin impregnated substantially continuous fibers circumferentially around the shell under a high degree of tension and in radial alignment with the flange on the head and longitudinally outward of said centeral portion of the head to deform the end of the shell and the flange and thereby prevent the head from moving outwardly of the shell when subjected to internal pressure, and thereafter curing the resin while maintaining the strand under said tension to provide an integral structure with the head firmly secured to the shell.

2. A method of fabricating a reinforced plastic vessel, comprising winding a generally cylindrical shell from a resin impregnated fibrous strand, inserting a head having a peripheral flange within an end of the shell with the flange facing outwardly of said end of the shell, disposing a bonding material between the flange and the inner surface of the shell, deforming the end of the shell and said peripheral flange radially inward by winding a strand of substantially continuous fibers impregnated with an uncured thermosetting resin circumferentially around the shell under a high degree of tension and in radial alignment with the flange to thereby prevent outward movement of the head with respect to the shell, and curing the resin while maintaining the strand under said tension to provide an integral structure with the head firmly bonded to the shell.

3. In a method of fabricating a reinforced plastic vessel, the steps of inserting a reinforced plastic head having a generally flat central portion and having a peripheral flange extending axially of said central portion within an end of a reinforced plastic shell with the flange extending outwardly of the shell and the outer end of the flange being substantially flush with the end of said shell, disposing a bonding material between the flange and the adjacent inner surface of the shell to seal the junction therebetween, deforming the flange and the end of the shell disposed longitudinally outwardly of the central portion of the head radially inwardly by winding a resin-impregnated strand of substantially continuous fibers circumferentially around the shell in radial alignment with the flange and under sufficient tension to thereby deform the end of the shell and the flange and reduce the diameter thereof, applying a resin capable of shrinking on curing to said strand, and curing the resin to thereby provide additional tension on the end of the shell to maintain the same in deformed condition.

4. A reinforced plastic vessel, comprising a generally cylindrical shell having an end portion diverging inwardly toward the axis of the shell, a head disposed within the end portion of the shell and having a central portion extending across the shell and having a peripheral flange facing outwardly of the end of the shell and diverging inwardly toward the axis of the shell, said flange being disposed in lapping relation with the inner surface of said shell and located longitudinally outward toward the end of the shell from the central portion of said head, and a strand of resin impregnated substantially continuous fibers disposed circumferentially around the outer surface of the shell in radial alignment with the lapping surfaces and located longitudinally outward toward the end of the shell from said central portion of the head, said strand being under a high degree of tension and maintaining the outer end portion of the shell and said flange in said diverging condition to thereby firmly hold the head within the end of the shell.

5. A reinforced plastic vessel, comprising a generally cylindrical shell having an end portion diverging inwardly toward the axis of the shell, a head disposed within the end portion of the shell and having a central portion disposed generally normally to the axis of the shell and having a peripheral flange facing outwardly of the end of the shell, and diverging inwardly toward the axis of the shell, said flange being disposed in lapping relation with the inner surface of the shell, a bonding material disposed between said peripheral flange and the inner surface of the shell, a band of substantially continuous fibers disposed circumferentially around the outer surface of the shell in radial alignment with the lapping surfaces and located longitudinally outward toward the end of the shell from said central portion of the head, said band having a diameter less than the outer diameter of the portion of the shell disposed longitudinally inwardly of said head, and a cured thermosetting resin bonding the fibers together and to the shell to thereby retain the shell and the flange in the diverging condition.

References Cited in the file of this patent

UNITED STATES PATENTS

| | | |
|---|---|---|
| 202,890 | Thornson et al. | Apr. 23, 1878 |
| 1,667,434 | Norton | Apr. 24, 1928 |
| 2,555,380 | Stuart et al. | June 5, 1951 |
| 2,718,583 | Noland et al. | Sept. 20, 1955 |
| 2,774,043 | Ramberg | May 1, 1956 |
| 2,785,442 | Boggs | Mar. 19, 1957 |
| 2,791,241 | Reed | May 7, 1957 |
| 2,837,456 | Parilla | June 3, 1958 |
| 2,849,144 | Southwell | Aug. 26, 1958 |
| 2,858,955 | Kroenert | Nov. 4, 1958 |
| 2,865,765 | Allen | Dec. 23, 1958 |
| 2,877,150 | Willson | Mar. 10, 1959 |
| 2,996,180 | Bruce | Aug. 15, 1961 |